H. C. BIETTE.
COMBINED COFFEE PERCOLATOR AND TEA STEEPER.
APPLICATION FILED APR. 11, 1917.
1,347,142.
Patented July 20, 1920.
2 SHEETS—SHEET 1.
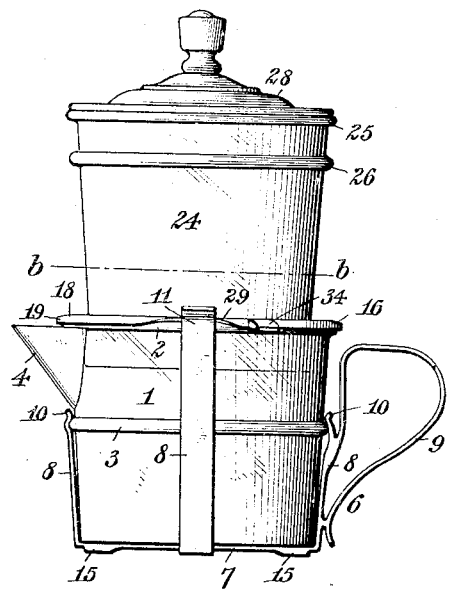
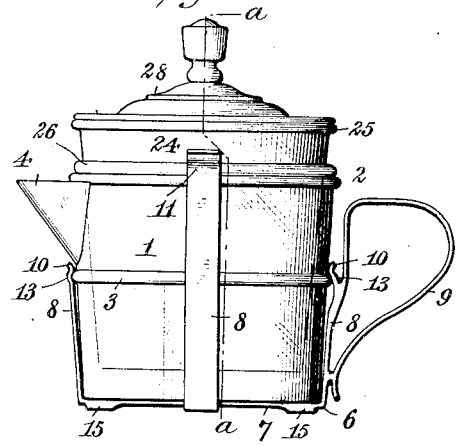
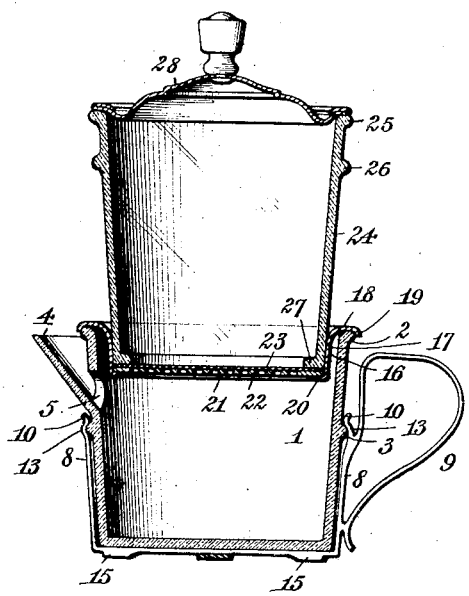
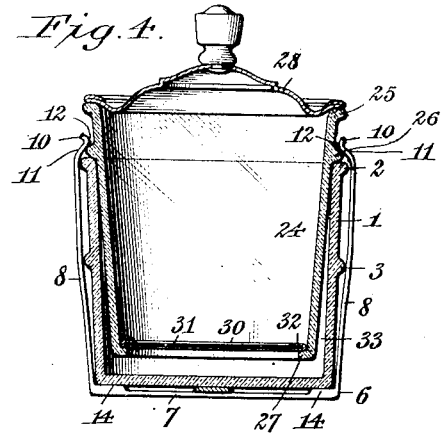
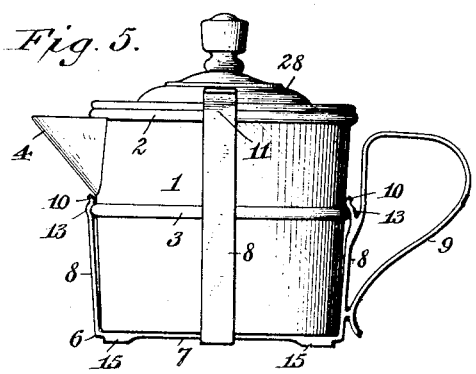
Witness:
E. M. Schweiger.
Henry C. Biette, Inventor.
By Emil Neubart
Attorney.

H. C. BIETTE.
COMBINED COFFEE PERCOLATOR AND TEA STEEPER.
APPLICATION FILED APR. 11, 1917.
1,347,142.
Patented July 20, 1920.
2 SHEETS—SHEET 2.
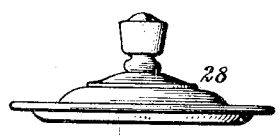
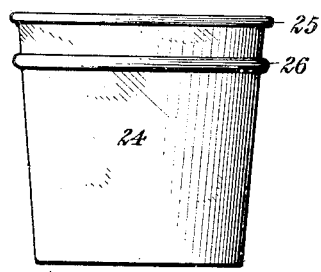
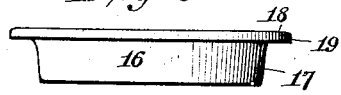
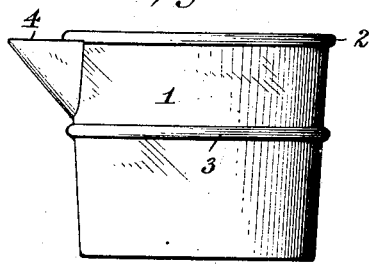
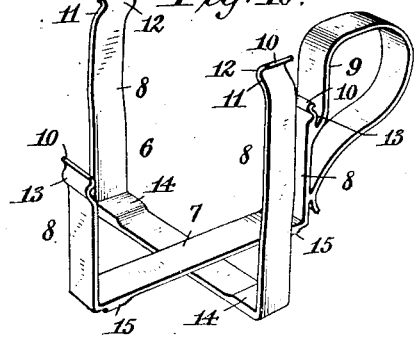
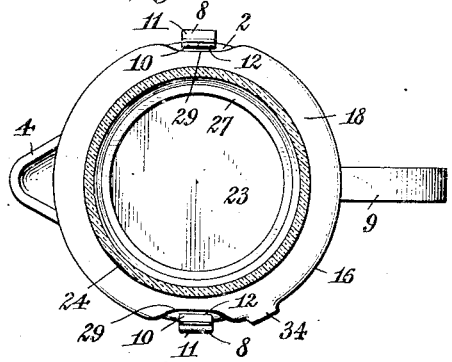
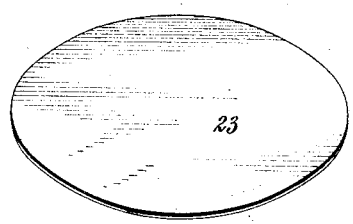
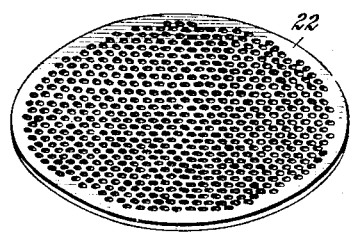
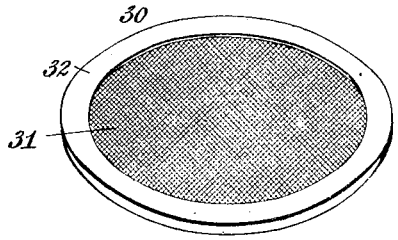
Witness:
E. M. Schweiger.
Henry C. Biette, Inventor.
By Emil Neuhart
Attorney.

UNITED STATES PATENT OFFICE.

HENRY C. BIETTE, OF BUFFALO, NEW YORK, ASSIGNOR OF ONE-HALF TO JOHN THOMSON AND ONE-HALF TO PAUL C. WASASIER, BOTH OF BUFFALO, NEW YORK.

COMBINED COFFEE-PERCOLATOR AND TEA-STEEPER.

1,347,142.  Specification of Letters Patent.  Patented July 20, 1920.

Application filed April 11, 1917. Serial No. 161,195.

*To all whom it may concern:*

Be it known that I, HENRY C. BIETTE, a citizen of the United States, residing at Buffalo, in the county of Erie and State of New York, have invented certain new and useful Improvements in Combined Coffee-Percolators and Tea-Steepers, of which the following is a specification.

My invention relates to a combined coffee percolator and tea steeper; and it has for one of its objects, the provision of a combined coffee percolator and tea steeper comprising a plurality of parts or members which are used in various combinations, and which, when used in one combination, serve as a coffee percolator and in another as a tea steeper.

It also has for its object the provision of a utensil of the type mentioned, the main parts or members of which are transparent so that the progress made during the percolation of the coffee or the steeping of the tea may be noted at a glance, and so that the utensil will be more sanitary than those now in use.

Another object is to construct a utensil of the type mentioned of heat resisting glass so that it may be subjected to heat either internally, externally, or both internally and externally and so that a utensil is provided in which there can exist no fissures or cracks through which the liquid contained within the utensil may be absorbed, as would happen to be the case if porcelain or other like vitreous material were used, in which event the flavor of the tea would be absorbed by the material forming the utensil when steeping the tea and would be imparted to the coffee when percolating the latter within the utensil, or vice versa.

Another object of my invention is the provision of a neat and attractive utensil of this kind which is composed of a number of assembled parts or members, which parts or members may be easily disassembled and each part thoroughly and easily cleansed.

A further object is to provide a holder for the utensil which may be said to form part thereof and which serves to hold the various parts or members together in at least two of the combinations in which they may be used.

A still further object is the provision of a coffee percolator provided with a removable straining member adapted to be displaced and another straining member substituted therefor each time coffee is being made.

A still further object is to provide a coffee percolator with a straining member, such as a disk of thin tissue paper or other thin straining material, which receives support at numerous points throughout its area so that it is not possible to become bulged under the weight of the ground coffee resting thereon.

A still further object is to provide a coffee percolator with a straining device, comprising a coarse straining member—which itself would permit too free passage of the liquid therethrough—and a fine straining member receiving support from said coarse straining member at all points except where the openings or meshes in said coarse straining member appear.

With these and other objects in view, the invention consists in a utensil of the kind referred to, comprising a plurality of parts which are assembled in different combinations, in one of which the parts are used as a coffee percolator, in the other of which the parts are used as a tea steeper, and in the third of which the parts used serve as a pot for containing coffee or tea, as the case may be.

It also consists in the combination of novelly constructed parts, including a holder whereby the parts are retained in assembled condition in the chosen combination.

It further consists in the novel features of construction and in the arrangement and combination of parts to be hereinafter described and more particularly pointed out in the subjoined claims.

In the drawings,—

Figure 1 is a side elevation of a coffee percolator, in which the parts of my improved utensil are assembled in a certain combination.

Fig. 2 is a vertical section taken through the coffee percolator, and in the plane of the handle and pouring spout.

Fig. 3 is a side elevation of a tea steeper in which the parts of my improved utensil are assembled in another combination.

Fig. 4 is a vertical section taken on line *a*—*a*, Fig. 3.

Fig. 5 is a side elevation of another combination of parts of my utensil forming a coffee or tea pot in which condition the parts are used for containing either coffee or tea after being percolated or steeped.

Figs. 6 to 9 inclusive are side elevations of certain parts used for forming the coffee percolator, all of which except Fig. 8 being also used in the combination of parts forming a tea steeper.

Fig. 10 is a perspective view of the holder which is used in all of the three combinations forming, respectively, the coffee percolator, the tea steeper, and the coffee or tea pot for containing coffee or tea when the percolation or steeping is completed.

Fig. 11 is a horizontal section taken on line b—b, Fig. 1.

Fig. 12 is a perspective view of the tissue paper disk or fine straining element through which the percolated coffee is adapted to pass.

Fig. 13 is a perspective view of the coarse straining element which supports the fine straining element shown in Fig. 12 and provides a free passage of the liquid into the pot after seeping through the fine straining element.

Fig. 14 is a detached perspective view of the tea strainer.

Referring now to the drawings in detail, like numeral of reference refer to like parts in the several figures.

The reference numeral 1 designates a pot which is formed of transparent material, preferably of heat-resisting glass. This pot may be used as a coffee or a tea pot; this being possible due to the fact that it is constructed of glass which cannot become fissured, as would be the case with porcelain or other like material, and which does not possess absorbing qualities. For this reason the pot may be used freely for both coffee and tea, since the flavor of one cannot be imparted to the other after a proper cleansing of the pot. Moreover, by making this pot of heat-resisting glass it may be subjected to the interior heat of the coffee or tea strained into it, or to external heat for heating coffee or tea, or for keeping the coffee or tea in heated condition, as may be required.

Said pot is provided at its upper edge with an external annular bead 2, and at a point between its upper and lower ends with a second annular bead 3. It is also provided with a pouring spout 4, and in that portion of the wall between the spout and the interior of the pot, a discharge opening 5 is formed through which the coffee or tea may be poured from the pot into the spout, and by the latter be directed into cups in the usual manner. This pot is one of the parts or elements of my improved utensil which is used in all the combinations of parts for the different purposes intended.

It will be observed that this pot is not provided with an integral handle, as is common with coffee or tea pots; but with a view of providing a suitable handle for the same a holder 6 is provided therefor. This holder has a supporting portion 7 which lies underneath the pot, retainer arms or members 8 which rise upwardly from said supporting member and together embrace the coffee pot. Said retainer arms or members are arranged in two pairs; those of one pair, which are disposed at diametrically opposite points of the pot, are longer than the retainer arms or members of the other pair, which are disposed at diametrically opposite points of the pot in a plane at right angles to the longer retainer arms or members, and formed integrally of one of said shorter retainer arms or members is a handle 9.

These retainer arms or members are made yielding outwardly and their upper extremities are flared outwardly, as at 10, so that the pot may be easily set into the holder; since in placing the same in position, the peripheral surface of the pot engages first the longer retainer arms or members and forces them outwardly and then the shorter retainer arms or members, forcing them outwardly also. The longer retainer arms or members are curved or bent inwardly near their upper extremities, as at 11, so that where these inwardly bent portions meet the outwardly bent extremities 10, rounded engaging surfaces 12 are formed, these surfaces being the parts which are brought into physical contact with the pot when positioning the latter within the pot and after the pot is positioned within the holder said engaging surfaces lie in a plane a short distance above the upper edge of the pot, for a purpose to appear hereinafter. The shorter arms or members are provided with outwardly bulged portions 13 near their upper extremities which merge into the flared extremities thereof so that substantially an ogee curve is imparted to the outer and inner faces of said shorter retainer arms or members at their upper ends, and when the pot is lowered into the holder the annular bead 3 of the pot engages the inner convex portions of said ogee curves and causes said retainer arms or members to be flexed outwardly to permit said annular bead to pass said convex portions and enter the inner concave portions of said ogee curves, in which it is confined. When the annular bead 3 engages the inner concaved portions of said ogee curves, which may also be termed inner grooves, the bottom of the pot rests upon the supporting portion.

This holder is formed of two strips of metal, each of which is bent into substantially U-formation and fashioned at its upper end, as described; and one of said strips has the handle 9 in piece therewith. Where these two strips of metal cross each other they are united in any suitable manner, but preferably by electric welding so that when completed this holder is practically a one-piece article; it being of course understood that the handle 9 is preferably also welded to the retainer arm or member on which it is supported.

One of the members of the supporting portion 7 of said holder is provided with enlargements 14 on its upper face, which enlargements have their upper faces in the plane of the upper face of the other member of said supporting portion; while said other member has enlargements 15 on its underside, the lower faces of which are in line with the lower surface of the first-mentioned member of said supporting portion. In this manner the holder is given proper support on a table or any other suitable surface, and the pot is also properly supported so that it cannot sway within the holder.

When placing the pot into the holder the spout 4 is arranged at a point diametrically opposite the handle 9, which arrangement is permitted by reason of the shorter retainer arms or members terminating in a plane beneath the lower point of said spout.

When assembling certain parts of the utensil for percolating coffee, a supporting member 16 is used, said member being stamped from suitable sheet metal and being in the form of a shallow dish having an open bottom. This supporting member therefore comprises a peripheral wall 17 of somewhat smaller diameter than the interior diameter of the pot 1, an outstanding flange 18 at the upper end of said wall having its marginal portion curved or bent downwardly, as at 19, and a narrow inwardly-directed flange 20 at the bottom of said wall. This supporting member is placed into the pot 1 with the flange 18 resting against the upper edge of the pot and the downwardly curved marginal portion of said flange overlapping the upper annular bead 2, as clearly shown in Fig. 2.

Placed within this supporting member is a straining or percolating device 21, which, in preferred form, comprises a coarse straining member 22 in the form of a disk which has its marginal portion resting upon the inwardly-directed flange of the supporting member 16, and a fine straining member 23 which is preferably in the form of a disk cut out of tissue or similar paper and which rests upon the coarse straining member and receives support therefrom at numerous points throughout its area. The coarse straining member is preferably stamped out of perforated sheet aluminum or other suitable metal; or it may be stamped out of any suitable material and perforated as desired; or, it may be a coarse wire-mesh screen or may have any other open-work construction permitting the free passage of percolated coffee therethrough after seeping slowly through the fine straining member 23. By using a coarse straining member and a fine straining member, the fine straining member is given support at all points except where the perforations or meshes of the coarse straining member appear. Sagging of the fine straining member is therefore entirely eliminated.

24 designates a container which is used in conjunction with the straining or percolating device 21 and the supporting member 16 when making coffee. It is desirable also to construct this container from transparent material, preferably from heat resisting glass, and it is given a circular contour transversely and tapered downwardly. At its upper end it is provided with an external annular bead 25 and a short distance beneath said bead it is provided with a second external annular bead 26. At its lower end the container is provided with a narrow inwardly-directed flange 27 which, while not necessary when using the same for percolating coffee, is nevertheless an important feature when using the container for steeping tea. This container is of a size to fit freely into the supporting member 16 while the latter is fitted into the upper end of the pot 1. The lower end of the container rests upon the marginal portion of the paper or other fine straining member 23 and holds the same properly in position on the metallic or coarse straining member 22, thus when the fine straining member is placed upon said coarse straining member in a smooth condition it is so retained by the container 24. The straining members 22, 23, serve as the bottom of said container when the parts are arranged in the combination shown in Figs. 1 and 2 for the purpose of making coffee.

28 designates a cover or lid which properly fits the upper open end of the container 24, and it is to be understood that this lid also properly fits the upper open end of the pot 1, as clearly shown in Fig. 5. The pot 1 and container 24 are therefore constructed with their upper ends of the same size, or approximately so, to the end that the cover 28 will serve two purposes and thus eliminate one part otherwise necessary.

With these parts arranged as described and as shown in Figs. 1 and 2, ground coffee is placed into the container 24, which coffee is to cover the paper disk or other fine straining member 23. Hot or boiling water is then poured into the container onto the ground coffee therein and this water saturates the ground coffee and passes therethrough, seeping through the paper disk or other fine straining member and thence passing through the coarse open-work straining member 22, from which it drips into the pot. When the water passes through the ground coffee it partakes of the flavor or aroma of the coffee, and by reason of the container and pot being made of transparent material the percolating action is clearly visible. Moreover, as heat resisting glass, of which the pot 1 and container 24 are preferably constructed, is very clear, the utensil may be delivered to the table and the user will be able to readily see whether the parts are thoroughly cleaned before ground coffee is introduced and the hot or boiling water poured into the container. This is a very desirable feature of my invention when using the utensil in hotels, dining cars, and other public places, as assurance may be had that the coffee is being made under sanitary conditions. The patron will naturally be interested in the percolating action, which may take place while he or she partakes of the meal.

When the container is positioned on the pot 1, and sufficient coffee has been percolated, the entire device as shown in Figs. 1 and 2 may be lifted when pouring the coffee from the pot, it being only necessary that slight pressure be exerted downwardly against the knob of the lid or cover 28 for holding the container in the supporting member 16 while tilting the utensil to pour the coffee; or if it is found that all of the water in the container has passed through the percolating member, the container 24 and supporting member 16 may be removed from the pot and the cover or lid 28 placed on the pot and clamped in place against the upper edge of the pot by the upper ends of the longer retainer arms or members 8 of the holder, as clearly shown in Fig. 5.

The upper ends of said long retainer arms or members 8 may also engage the supporting member 16 and lock or retain the same in position in the pot, but I preferably cut away the flange 18 of said supporting member at diametrically opposite points, as at 29, so that this supporting member may be passed down freely between the upper extremities of the long retainer arms or members 8 of the holder without coming in contact therewith. With a view of making it more convenient to remove the supporting member 16 from the pot, I preferably bulge the downwardly curved or bent portion 19 of the flange 18 outwardly, as at 34, at one point, thus enabling the user to easily take hold of said supporting member and remove the same from the pot.

After the hot or boiling water has seeped through the ground coffee and the straining device, the container may be removed from the pot with the supporting member 16. The parts of the straining device may be separated and the grounds with the fine straining disk of paper may be thrown away; and after the parts are cleansed, they may be assembled and a new paper disk laid upon the coarse open-work straining disk 22, which again places the utensil in condition for percolating. In this manner a new paper disk is used each time coffee is to be made, thus dispensing with the need of washing linen bags heretofore used in percolators, and rendering the utensil more sanitary than would otherwise be possible.

When steeping tea, certain parts of my device are used in another combination; or, in other words, the supporting member 16 with its straining disks 22, 23, are dispensed with, and in lieu thereof I use a straining disk 30 which is preferably constructed of very fine wire gauze 31 bound within a metallic rim 32, said disk being of a size to frictionally fit within the container 24 and rest upon the inwardly-directed flange 27 at the lower end of said container. The container with the straining disk 30 is lowered into the pot 1 until the external annular bead 26 of the container engages the upper edge of said pot, as clearly shown in Figs. 3 and 4, said bead determining the extent to which the container is to be lowered into the pot.

It is to be noted that this container is somewhat smaller in diameter than the pot, so that a space 33 intervenes between the two. There is also considerable space between the lower end of the container and the bottom of the pot, and this last-mentioned space may be enlarged if desired by merely lowering the bead 26 on the container, or making the pot 1 somewhat higher. When the container is placed within the pot in the manner described, the straining disk 30 serves as the bottom of the container and the long retainer arms or members 8 of the holder have their upper ends engaging the external annular bead 26 of the container to lock the latter within the pot.

With the parts in this position the utensil is ready for steeping tea, it being only necessary to place the desired quantity of tea into the container, pour boiling water thereinto and retain the container within the pot the desired length of time, which may vary in accordance with the strength of the tea desired. This can easily be determined by the color of the beverage through the transparent wall of the pot.

The lid 28 is of course placed upon the container during the steeping process, and when the container is removed this lid is placed onto the pot and held in position thereon by the upper extremities of the long arms or members 8 of the holder.

After the tea is steeped to the desired strength, it is only necessary to withdraw the container from the pot, whereupon the liquid within the container will flow freely through the strainer into the pot leaving the beverage within the pot clear, and free from all tea leaves.

It will be observed that my invention is simple, strong, durable and easily assembled in different combinations, and as readily disassembled so as to permit of thoroughly cleansing all the parts thereof; and, if desired, parts of the utensil may be entirely dispensed with, when, for instance, it is desirable to use the utensil only as a coffee percolator, or as a tea steeper; and while the construction which has been described is the preferred one, it is to be understood that variations and changes may be made therein. The invention is not therefore to be confined to the specific construction or kinds of material hereinbefore described.

Having thus described my invention, what I claim is,—

1. A utensil of the kind described, comprising a pot provided with a pouring spout and exterior projecting portions, a holder into which said pot is placed provided with portions engaging the exterior projecting portions of said pot to hold the latter within said holder, a coffee container having its lower portion fitting into the upper portion of said pot, and a supporting member having a straining element and being adapted to support said coffee container.

2. A utensil of the kind described, comprising a pot having an annular exterior bead in a plane between its upper and lower ends, a holder adapted to receive said pot and having retainer arms of two different lengths, the shorter retainer arms being adapted to engage said annular exterior bead to retain said pot within said holder, and a member associated with said pot and adapted to rest upon its upper edge and be engaged by the longer of said retainer arms.

3. A utensil of the kind described, comprising a pot provided with a pouring spout at one point and with an annular exterior bead between its upper and lower ends, a holder into which said pot is adapted to be placed, said holder having two pairs of upstanding yielding arms, the arms of one pair being shorter than those of the other and adapted to engage said exterior bead with their upper ends, one of said shorter arms having a handle thereon adapted to be arranged diametrically opposite said pouring spout when the pot is placed within the holder, and an associated member adapted to be clamped against the upper edge of the pot by said pair of long retainer arms when said member is used in conjunction with said pot.

4. A utensil of the kind described, comprising a pot having a pouring spout, a holder adapted to receive said pot and having a handle which is positioned at a point diametrically opposite said pouring spout, a supporting member fitting into the upper end of said pot and having an outstanding flange resting upon the edge of said pot and an inwardly-directed flange at its lower end, a straining device receiving support at its marginal portion from said inwardly-directed flange, a container set into said supporting member and onto said straining device, and a cover for said container.

5. A utensil of the kind described, comprising a handleless pot having a pouring spout at one point, a holder into which said pot is placed having a pair of upstanding spring arms and a handle adapted to be positioned diametrically opposite said pouring spout when the pot is placed within the holder, and a cover for said pot adapted to be engaged at its edge by the upper ends of said spring arms.

6. A utensil of the kind described, comprising a handleless pot having a pouring spout at one point and an exterior projecting portion or portions in a plane between the upper and lower ends thereof, a holder having two pairs of upstanding spring arms, the arms of each pair being of different lengths, each arm having its upper extremity flared outwardly and the shorter arms having transverse inner grooves beneath their outwardly flared extremities, said grooves being adapted to receive the exterior projecting portion or portions of said pot, one of the shorter arms of said holder having a handle which is adapted to be positioned diametrically opposite the pouring spout of said pot when the latter is placed within the holder, and a cover adapted to fit onto said pot and be engaged by the upper ends of the long arms of said holder.

In testimony whereof I affix my signature.

HENRY C. BIETTE.